United States Patent
Tokita et al.

(12) 
(10) Patent No.: US 7,762,657 B2
(45) Date of Patent: Jul. 27, 2010

(54) INKJET INK, PROCESSING LIQUID FOR INKJET INK, INK SET FOR INKJET INK, INK TANK FOR INKJET INK, INKJET RECORDING METHOD AND INKJET RECORDING APPARATUS

(75) Inventors: Yoshimi Tokita, Ebina (JP); Ken Hashimoto, Ebina (JP)

(73) Assignee: Fuji Xerox Co., Ltd., Tokyo (JP)

(*) Notice: Subject to any disclaimer, the term of this patent is extended or adjusted under 35 U.S.C. 154(b) by 601 days.

(21) Appl. No.: 11/267,279

(22) Filed: Nov. 7, 2005

(65) Prior Publication Data

US 2006/0293410 A1 Dec. 28, 2006

(30) Foreign Application Priority Data

Jun. 24, 2005 (JP) ............................. 2005-184740

(51) Int. Cl.
*C09D 11/10* (2006.01)
(52) U.S. Cl. ............................. 347/96; 347/95; 347/98; 347/100; 106/31.13; 524/1
(58) Field of Classification Search .............. 106/31.13, 106/218; 523/160; 524/366; 347/1, 54, 347/56, 68, 73, 100, 112
See application file for complete search history.

(56) References Cited

U.S. PATENT DOCUMENTS

| | | | | |
|---|---|---|---|---|
| 5,589,522 A | * | 12/1996 | Beach et al. | ................. 523/160 |
| 5,640,187 A | * | 6/1997 | Kashiwazaki et al. | ....... 347/101 |
| 5,713,993 A | * | 2/1998 | Grezzo Page et al. | .... 106/31.85 |
| 6,005,023 A | * | 12/1999 | Anton et al. | ................. 523/161 |
| 6,638,995 B1 | * | 10/2003 | Gelarden | .................... 523/160 |
| 6,924,327 B2 | * | 8/2005 | Sano et al. | ................... 523/160 |
| 6,936,656 B2 | * | 8/2005 | Muhlebach et al. | ......... 524/560 |
| 7,008,994 B1 | * | 3/2006 | Waki | .......................... 524/556 |
| 7,331,665 B2 | * | 2/2008 | Tomotake et al. | ........... 347/100 |
| 2001/0018472 A1 | * | 8/2001 | Parazak et al. | .............. 523/160 |
| 2001/0023265 A1 | * | 9/2001 | Hidaka et al. | ................ 523/161 |
| 2002/0180854 A1 | * | 12/2002 | Sato et al. | ...................... 347/96 |
| 2004/0201658 A1 | * | 10/2004 | Jackson et al. | .............. 347/100 |
| 2005/0075418 A1 | * | 4/2005 | Nishiguchi | .................. 523/160 |

FOREIGN PATENT DOCUMENTS

| | | |
|---|---|---|
| JP | A 8-25801 | 1/1996 |
| JP | A 2000-212486 | 8/2000 |
| JP | A 2004-122465 | 4/2004 |

OTHER PUBLICATIONS http://www.databazaar.com/Inkjet_Cartridge/Catalog/S750_4638.html.*
Liu et al. Thin Solid Films 478 (2005) 275-279.*

* cited by examiner

*Primary Examiner*—David Wu
*Assistant Examiner*—Vu Nguyen
(74) *Attorney, Agent, or Firm*—Oliff & Berridge, PLC (57) ABSTRACT

An ink set for an inkjet of the present invention comprises an ink and a processing liquid, wherein at least one of the ink and the processing liquid contains a water-soluble non-linear polymer. The non-linear polymer has at least one selected from the group consisting of a branched structure, a cross linking structure and a mesh structure in a molecule.

10 Claims, 5 Drawing Sheets

COMB LIKE NON LINEAR POLYMER

FIG. 5B

BRANCHED NON LINEAR POLYMER

FIG. 5C

LADDER LIKE NON LINEAR POLYMER

FIG. 5D

STAR LIKE NON LINEAR POLYMER

FIG. 5E

LATTICE LIKE NON LINEAR POLYMER

FIG. 5F

BRIDGE LIKE NON LINEAR POLYMER

INKJET INK, PROCESSING LIQUID FOR INKJET INK, INK SET FOR INKJET INK, INK TANK FOR INKJET INK, INKJET RECORDING METHOD AND INKJET RECORDING APPARATUS

CROSS-REFERENCE TO RELATED APPLICATION

This application claims priority under 35 USC 119 from Japanese Patent Application No. 2005-184740, the disclosure of which is incorporated by reference herein.

BACKGROUND OF THE INVENTION

1. Field of the Invention

The present invention relates to an ink for an inkjet, a processing liquid for inkjet, an ink set for an inkjet, an ink tank for an inkjet, an inkjet recording method, and an inkjet recording apparatus.

2. Description of the Related Art

Inkjet systems for ejecting ink from an ink ejection port formed of a nozzle, a slit or a porous film have been used in many printers due to their being small-sized and inexpensive. Of these inkjet systems, a piezo inkjet system for ejecting ink by utilizing the deformation of a piezoelectric element and a thermal inkjet system for ejecting ink by utilizing the boiling phenomenon of an ink by applying thermal energy are excellent in a high resolution and a high-speed printing property.

According to the inkjet system, a method of improving the image quality by preventing blurring by ejecting a processing liquid having a function of aggregating or insolubilizing a colorant, or the like as an ink component such that the liquid is brought into contact with the ink on a recording medium has been discussed.

By aggregating or insolubilzing the ink component, a high image quality can be obtained owing to the presence of the colorant at a high density in the vicinity of the surface of the recording medium, however, on the other hand, a problem that the reliability such as the rub resistance becomes poor arises.

In order to improve the problem, a method of adding a polymer into an ink to aggregate or insolubilize the polymer together with a pigment has been known as a method of improving the rub resistance of an image.

For example, Japanese Patent Application Laid-Open (JP-A) No. 2000-212486 discloses an ink containing 0.1 to 1 part by weight of a styrene-(meth)acrylic acid-based water-soluble resin as a pigment dispersing agent. Further, JP-A No. 2004-122465 discloses a method of forming a covering layer on at least a part of an image, using an ink containing a pigment and a polymer having —COOA by 10 to 100% with respect to the weight of the pigment. Moreover, JP-A No. 8-25801 discloses those in which one of polyvinyl pyrrolidone and polyacrylic acid is contained, which are different from each other in a liquid composition and an ink, respectively.

However, since the polymers to be added in accordance with these proposals are linear polymers, although the rub resistance can be obtained, it is not sufficient from the viewpoint of the recent high technical demand, and thus the improvement is desired in the present situation.

SUMMARY OF THE INVENTION

Therefore, the present invention was made in view of the above problems, and the present invention provides an ink for an inkjet having an excellent rub resistance, and an ink set for an inkjet, using the same. The invention further provides a processing liquid for inkjet, capable of providing the excellent rub resistance to an ink, and an ink set for an inkjet, using the same. Furthermore, the invention provides an inkjet recording method utilizing the ink sets and an inkjet recording apparatus.

The above-mentioned problems can be solved as follows.

That is, an ink for an inkjet of the invention contains at least a colorant, a non-linear polymer, a water-soluble organic solvent and water.

In the ink for an inkjet of the invention, it is preferable that the above-mentioned non-linear polymer is water-soluble. Moreover, it is preferable that the above-mentioned non-linear polymer has at least one selected from the group consisting of a branched structure, a cross linking structure and a mesh structure in a molecule. Further, it is preferable that the above-mentioned non-linear polymer has a branched or ladder like shape.

Moreover, in the ink for an inkjet of the invention, it is preferable that the above-mentioned non-linear polymer is at least one kind selected from the group consisting of an anionic polymer, a cationic polymer, a nonionic polymer and an amphoteric polymer. These polymers may be used alone or in combination of two or more kind of polymers.

Further, in the ink for an inkjet of the invention, it is preferable that the weight average molecular weight of the above-mentioned non-linear polymer is 1,000 to 100,000. Moreover, it is preferable that the addition amount of the above-mentioned non-linear polymer is 1 to 30% by mass with respect to the total amount of the ink.

Moreover, in the ink for an inkjet of the invention, it is preferable that the viscosity of the ink is 1.2 to 30.0 mPa·s. Further, it is preferable that the surface tension of the ink is 20 to 35 mN/m.

A processing liquid for inkjet of the invention contains a component having the function of aggregating or insolubilizing the component of a recording liquid when the processing liquid is brought into contact with the recording liquid containing at least a colorant and water, and a water-soluble organic solvent, and further contains a non-linear polymer. Here, the recording liquid corresponds to an ink.

In the processing liquid for inkjet of the invention, it is preferable that the above-mentioned non-linear polymer has at least one selected from the group consisting of a branched structure, a cross linking structure and a mesh structure in a molecule. Further, it is preferable that the above-mentioned non-linear polymer has a branched or ladder like shape. Moreover, it is preferable that the above-mentioned non-linear polymer is water-soluble.

Moreover, in the processing liquid for inkjet of the invention, it is preferable that the weight average molecular weight of the above-mentioned non-linear polymer is 1,000 to 100,000. Moreover, it is preferable that the viscosity of the processing liquid is 1.2 to 30.0 mPa·s.

An ink set for an inkjet of the invention comprises at least an ink for an inkjet containing at least a colorant, a water-soluble organic solvent and water, and a processing liquid for inkjet containing at least a component having a function of aggregating or insolubilizing an ink component, a water-soluble solvent and water, wherein at least one of the ink and the processing liquid further contains a non-linear polymer.

That is, in the ink set for an inkjet of the invention, either the above-mentioned ink for an inkjet of the invention as the ink or the above-mentioned processing liquid for inkjet of the invention as the processing liquid may be used.

An ink tank for an inkjet of the invention stores the liquids of the ink for an inkjet of the invention or the above-mentioned ink set for an inkjet of the invention.

In an inkjet recording method of the invention, the ink set for an inkjet of the invention is used for forming an image by ejecting each of the liquids onto a recording medium.

In the inkjet recording method of the invention, the liquid supplied from the ink tank for an inkjet, in which the ink set for an inkjet is stored, can be ejected onto the recording medium.

An inkjet recording apparatus of the invention comprises a recording head for ejecting liquids onto a recording medium, utilizing the ink set for an inkjet of the invention.

The inkjet recording apparatus of the invention may further comprise an ink tank for an inkjet for storing the ink set for an inkjet so as to supply the liquids to the recording head.

According to the present invention, an ink for an inkjet having an excellent rub resistance, and an ink set for an inkjet, using the ink can be provided. Moreover, a processing liquid for inkjet, capable of providing the excellent rub resistance to an ink, and an ink set for an inkjet, using the same can also be provided. Furthermore, an inkjet recording method utilizing the ink set and an inkjet recording apparatus can also be provided.

DETAILED DESCRIPTION OF THE INVENTION (Ink Set for an Inkjet)

Hereinafter, the ink for an inkjet of the present invention will be explained together with the ink set for an inkjet of the invention.

The ink set for an inkjet of the invention comprises an ink and a processing liquid. At least one of the ink and the processing liquid contains a non-linear polymer. The ink containing the non-linear polymer is the ink for an inkjet of the invention, and the processing liquid containing the non-linear polymer is the processing liquid for inkjet of the invention.

Conventionally, as the polymer blended in the ink, a linear one has been used such that the linear polymer is aggregated or insolubilzed together with a pigment by the processing liquid for improving an image quality. However, according to the ink set for an inkjet of the invention, since the non-linear polymer is blended in the ink instead of the linear polymer, the interaction owing to the entanglement among the polymer molecule chains is strengthened when the polymer is aggregated or insolubilized by the use of the processing liquid so that the excellent rub resistance can be realized in an amount same as the amount of the linear polymer. In particular, an organic acid or monovalent cationic compound is used as the aggregating component of the processing liquid, the interaction owing to the entanglement among the molecule chains of the non-linear polymer becomes extremely higher as compared with the linear polymer so that the excellent rub resistance can be realized. Moreover, the non-linear polymer can also be included in the processing liquid so that the excellent rub resistance can be realized similarly.

Some non-linear polymers have at least one of the branched structure, the cross linking structure and the mesh structure in the molecule. In the case of a non-linear polymer having the branched structure (including the mesh structure), in the invention, the ratio of the weight average molecular weight of the principal chain with respect to the total weight average molecular weight is 30 to 95% by mass. The ratio is preferably 40 to 90% by mass, and it is further preferably 50 to 80% by mass. Here, the principal chain denotes the chain to provide the longest stem in the polymer molecule structure. In the case of a non-linear polymer having a star like, ladder like or lattice like shaped structure (mesh structure), the ratio of the weight average molecular weight of the principal chain may be 50% by mass or less. The ratio of the weight average molecular weight of the principal chain can be determined by the structural analysis by the use of a nuclear magnetic resonance device, an X ray analysis device, or the like.

On the other hand, in the case of a non-linear polymer having the cross linking structure in the invention, the ratio of the cross linking agent with respect to the main component is 0.01 to 30% by mass. The ratio is preferably 0.05 to 20% by mass, and it is further preferably 0.1 to 15% by mass. Here, the main component denotes the polymer component excluding the cross linking agent. The ratio of the cross linking agent can be calculated form the masses of the added cross linking agent and the polymer component.

The non-linear polymer is preferably a water-soluble polymer or a hydrophilic polymer (self dispersing type polymer). From the viewpoint of the stability of the polymer in the ink, it is particularly preferably a water-soluble polymer. Here, the water-soluble polymer is used in the present in the form of an aqueous solution, a dispersion containing water, a slurry, or an emulsified suspension.

Moreover, the non-linear polymer can also be used as a latex, a polymer emulsion, a polymer dispersion, a polymer suspension, or the like, in which solid polymer particles are emulsified or dispersed in water.

The non-linear polymer may be at least one kind selected form the group consisting of an anionic polymer, a nonionic polymer, a cationic polymer and an amphoteric polymer. It is particularly preferably an anionic polymer or a nonionic polymer. Moreover, the non-linear polymer may be a polymer mixture of polymers selected from the group consisting of an anionic polymer, a cationic polymer and an amphoteric polymer and a nonionic polymer. The non-linear polymer may be a polymer obtained either by adding a cross linking agent to a single monomer or a copolymer of two or more kinds of different monomers. The non-linear polymer can be obtained from these kinds of monomers by the polymerization method and the cross linking method.

As anionic polymers, cationic polymers, or amphoteric polymers, for example, copolymers of monomers having an α,β-ethylene unsaturated group can be exemplified. Examples of the monomer having the α,β-ethylene unsaturated group include acrylic acid, methacrylic acid, crotonic acid, itaconic acid, itaconic acid monoester, maleic acid, maleic acid monoester, fumaric acid, fumaric acid monoester, vinyl sulfonic acid, styrene sulfonic acid, ally sulfonate, allyl phosphonate, vinyl phosphonate, vinyl naphthalene sulfonate, vinyl alcohol, acrylamide, methacryloxyethyl phosphate, bismethacryloxyethyl phosphate, methacryloxyethyl phenyl acid phosphate, ethylene glycol dimethacrylate, diethylene glycol dimethacrylate, a styrene derivative such as styrene, α-methylstyrene, vinyl toluene, vinyl cyclohexane, vinyl naphthalene, a vinyl naphthalene derivative, acrylic acid alkylester, phenyl acrylate, alkyl methacrylate, phenyl methacrylate, cycloalkyl methacrylate, alkyl crotonate, dialkyl itaconate, and dialkyl maleinate.

The polymers obtained by homopolymerization of the monomer having the ethylenic α,β-unsaturated group, or copolymers obtained by copolymerization of a plurality of the monomers having the ethylenic α,β-unsaturated groups can be used as the polymer dispersant. Specific examples thereof include polyacrylic acid, polymethacrylic acid, styrene-styrene sulfonic acid copolymer, styrene-maleic acid copolymer, styrene-methacrylic acid copolymer, styrene-acrylic acid copolymer, vinylnaphthalene-maleic acid copolymer, vinylnaphthalene-methacrylic acid copolymer, vinylnaphthalene-acrylic acid copolymer, alkyl acrylate-acrylic acid copolymer, alkyl methacrylate-methacrylic acid copolymer, acrylic acid-acrylonitrile copolymer, styrene-alkyl methacrylate-methacrylic acid copolymer, styrene-alkyl acrylate-acrylic acid copolymer, styrene-phenyl methacrylate-methacrylic acid copolymer, and styrene-cyclohexyl methacrylate-methacrylic acid copolymer.

As the nonionic polymer, a polyvinyl alcohol, a polyvinyl pyrrolidone, a starch, a methyl cellulose, or the like can be presented.

As the shape of the non-linear polymer, as shown in FIG. 5, comb-like (A), branch-like (B), ladder-like (C), star-like (D), lattice (mesh)-like (E), or bridge-like (F), or the like can be exemplified. Among these examples, the branch-like and the ladder-like polymers are preferable. For example, the branch like non-liner polymer can be obtained by polymerizing styrene/divinyl benzene/methacrylic acid=1/3/6 with a polycarbodiimide based cross linking agent. Moreover, the ladder-like non-linear polymer can be obtained by for example polymerizing an acrylic amide with N,N'-methylene bisacrylamide.

The weight average molecular weight of the non-linear polymer is preferably 1,000 to 100,000, and it is more preferably 1,500 to 50,000, and it is further preferably 1,500 to 30,000. When the weight average molecular weight is in the above range, the ink ejection characteristics and the rub resistance can both be achieved.

The acidic value of the non-linear polymer is preferably 80 to 250 mgKOH/g, and it is more preferably 90 to 200 mgKOH/g. By having the acidic value in the above-mentioned range, the rub resistance can be obtained while improving the dissolving property to the ink. Here, the acidic value denotes the number of milligrams of a potassium hydroxide necessary for neutralizing the acid included in 1 g of the specimen.

The glass transition temperature (Tg) of the non-linear polymer is preferably 0 to 150° C., and more preferably 20 to 100° C. When the glass transition temperature (Tg) is in the above range, a preferable fixing property can be obtained. Here, the glass transition point denotes the value measured by the method defined in the ASTM D3418-82 (DSC method).

The addition amount of the non-linear polymer is preferably 0.01 to 30% by mass with respect to the total amount of the ink (or the total amount of the processing liquid), and it is more preferably 0.1 to 10% by mass. When the addition amount is in the above range, the ink (or processing liquid) ejection characteristics and the rub resistance can both be achieved.

Hereinafter, the ink (ink for an inkjet of the invention) will be explained in detail.

The ink contains at least water, a water-soluble organic solvent and a colorant in addition to the non-linear polymer. Moreover, as needed, other additives may be included.

Next, the colorant will be explained. As the colorant, either a dye or a pigment can be used, but, a pigment is preferable. As the pigment, either an organic pigment or an inorganic pigment can be used. As the black pigment, carbon black pigments such as a furnace black, a lamp black, an acetylene black, and a channel black can be presented. In addition to black and three primary colors of cyan, magenta and yellow, specific color pigments of red, green blue, brown, white, or the like, metal glossy pigments of gold, silver, or the like, colorless or pale color extender pigments, plastic pigments, or the like may be used. Moreover, a pigment newly synthesized for the invention may be used as well.

Moreover, particles prepared by fixing a dye or a pigment onto the surface of silica, alumina, polymer beads, or the like as the core, an insoluble lake product of a dye, a colored emulsion, a colored latex, or the like can also be used as a pigment.

Specific examples of the black pigment used in the present invention include Raven 7000, Raven 5750, Raven 5250, Raven 5000 Ultra II, Raven 3500, Raven 2000, Raven 1500, Raven 1250, Raven 1200, Raven 1190 ULTRA II, Raven 1170, Raven 1255, Raven 1080 and Raven 1060 (manufactured by Columbian Carbon Company); Regal 400R, Regal 330R, Regal 660R, Mogul L, Black Pearls L, Monarch 700, Monarch 800, Monarch 880, Monarch 900, Monarch 1000, Monarch 1100, Monarch 1300 and Monarch 1400 (manufactured by Cabot Corporation): Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (manufactured by Degussa Co.): and No. 25, No. 33, No. 40, No. 47, No. 52, No. 900, No. 2300, MCF-88, MA 600, MA 7, MA 8 and MA 100 (manufactured by Mitsubishi Chemical Co., Ltd.). However, the pigments are not restricted thereto.

While specific examples of the cyan color pigments include C.I. Pigment Blue-1, -2, -3, -15, -15:1, -15:2, -15:3, -15:4, -16, -22 and -60, the pigments are not restricted thereto.

While specific examples of the magenta color pigments include C.I. Pigment Red-5, -7, -12, -48, -48:1, -57, -112, -122, -123, -146, -168, -177, -184, -202, and C.I. Pigment Violet -19, the pigments are not restricted thereto.

While specific examples of the yellow color pigments include C.I. Pigment Yellow-1, -2, -3, -12, -13, -14, -16, -17, -73, -74, -75, -83, 93, -95, -97, -98, -114, 128, -129, -138, -151, -154 and -180, the pigments are not restricted thereto.

Here, in the case a pigment is used as the colorant, it is preferable to use a pigment dispersing agent in a combination thereof. As a usable pigment dispersing agent, a polymer dispersing agent, an anionic surfactant, a cationic surfactant, an amphoteric surfactant, a nonionic surfactant, and the like are exemplified.

As the polymer dispersing agent, a polymer having a hydrophilic structure part and a hydrophobic structure part can preferably be used. As the polymer having a hydrophilic structure part and a hydrophobic structure part, a condensation-based polymer and an addition polymer can be used. As the condensation-based polymer, known polyester based dispersing agents can be exemplified. As the addition polymer, addition polymers of monomers having an α,β-ethylenically unsaturated group can be exemplified. By copolymerizing optionally a monomer having an α,β-ethylenically unsaturated group having a hydrophilic group and a monomer having an α,β-ethylenically unsaturated group having a hydrophobic group in combination, a targeted polymer dispersing agent can be obtained. Moreover, a homopolymer of monomers having an α,β-ethylenically unsaturated group having a hydrophilic group can be used as well.

As the monomer having an a,o-ethylenically unsaturated group having a hydrophilic group, monomers having a carboxyl group, a sulfonic acid group, a hydroxyl group, a phosphoric acid group, or the like, such as acrylic acid, methacrylic acid, crotonic acid, itaconic acid, itaconic acid monoester, maleic acid, maleic acid monoester, fumaric acid, fumaric acid monoester, vinyl sulfonic acid, styrene sulfonic acid, sulfonated vinyl naphthalene, vinyl alcohol, acrylic amide, methacryloxy ethyl phosphate, bismethacryloxy ethyl phosphate, methacryloxy ethyl phenyl acid phosphate, ethylene glycol dimethacrylate, and diethylene glycol dimethacrylate can be exemplified.

As the monomer having an α,β-ethylenically unsaturated group having a hydrophobic group, styrene derivatives such as styrene, methylstyrene and vinyl toluene, vinyl cyclohexane, vinyl naphthalene, vinyl naphthalene derivatives, alkyl acrylate, alkyl methacrylate, phenyl methacrylate, cycloalkyl methacrylate, alkyl crotonate, dialkyl itaconate, dialkyl maleate and the like are exemplified.

Preferable examples of the polymer which is used as a polymer dispersant include styrene-styrene sulfonic acid copolymer, styrene-maleic acid copolymer, styrene-methacrylic acid copolymer, styrene-acrylic acid copolymer, vinylnaphthalene-maleic acid copolymer, vinylnaphthalene-methacrylic acid copolymer, vinylnaphthalene-acrylic acid copolymer, alkyl acrylate-acrylic acid copolymer, alkyl methacrylate-methacrylic acid copolymer, styrene-alkyl methacrylate-methacrylic acid copolymer, styrene-alkyl acrylate-acrylic acid copolymer, styrene-phenyl methacrylate-methacrylic acid copolymer, and styrene-cyclohexyl methacrylate-methacrylic acid copolymer. In addition, a monomer having a polyoxyethylene group or a hydroxyl group may be appropriately polymerized.

As the above-mentioned polymer dispersing agent, from the viewpoint of achieving both the dispersing property of the pigment and the ink ejection property, the polymer dispersant having a weight average molecular weight of 2,000 to 50,000 are preferable. The polymer dispersant having a weight average molecular weight of 3,000 to 30,000 are more preferable, and 4,000 to 20,000 are further preferable.

These pigment dispersing agents may either be used alone or two or more kinds in combination. Although the addition amount of the pigment dispersing agent varies with the types of the pigments largely, in general, it is added at a ratio of 0.1 to 100% by mass in total with respect to the pigment, preferably 1 to 70% by mass, and further preferably 3 to 50% by mass.

A self-dispersible pigment in water can be used as a colorant. The self-dispersible pigment in water used in the present invention refers to the pigment having many water-solubilizing groups on the surface of the pigment, which can be stably dispersed in water without adding any polymer dispersant. The self-dispersible pigment in water is practically obtained by applying surface modification treatments such as an acid or a base treatment, a coupling agent treatment, a polymer graft treatment, a plasma treatment or a redox treatment on so-called usual pigments.

As a self-dispersible pigment in water, in addition to the surface-modified pigments described above, commercially available pigments such as Cab-o-jet-200, Cab-o-jet-300, IJX-253, IJX-266, IJX-273, IJX-444, IJX-55, and Cabot 260 (manufactured by Cabot Corporation), and Microjet Black CW-1 and CW-2 (manufactured by Orient Chemical Industries, Ltd.) may also be used as the self-dispersible pigment in water.

As the self dispersing pigment, a pigment having as a functional group at least a sulfonic acid, a sulfonate, a carboxylic acid, or a carboxylate on the surface thereof is preferable. A pigment having as a functional group at least a sulfonic acid or a sulfonate on the surface thereof is more preferable.

The pigment coated with a resin may be used as the colorant. Such pigment is called as microcapsule pigments, which include commercially available microcapsule pigments manufactured by Dainippon Ink & Chemicals, Inc. and Toyo Ink MFG Co., Ltd. as well as microcapsule pigments prepared for use in the present invention.

Moreover, a resin dispersing type pigment with a polymer substance chemically bonded with the above-mentioned pigment can also be used.

The content of the colorant is in the range of not less than 0.1% by mass and not more than 20% by mass, preferably not less than 1% by mass and not more than 10% by mass. Sufficient optical density may not be obtained when the content of the colorant in the liquid is less than 0.1% by mass, while the liquid ejection characteristics may become unstable when the content of the colorant is larger than 20% by mass.

As needed, a colorant may be contained in the processing liquid as described hereinafter. The content of the colorant contained in the processing liquid in this case is preferably 0.1% by mass or more and 20% by mass or less, and more preferably 1% by mass or more and 10% by mass or less. Since the processing liquid contains a colorant, the image density enhancing effect can be obtained. Moreover, by using a processing liquid containing a colorant as a color ink for an inkjet printer, the number of the printing heads to be installed in the printer can be reduced so that the production cost of the recording apparatus and the running cost at the time of printing can be reduced.

The volume average particle size of the colorant is preferably 10 nm or more and 1,000 nm or less, more preferably 30 nm or more and 250 nm or less, and further preferably 50 nm or more and 200 nm or less. In the case the volume average particle size of the colorant is too small, the optical density may be low. On the other hand, in the case the volume average particle size of the colorant is too large, the storability of the colorant and the jetting stability may not be ensured.

The volume average particle size of the colorant denotes the particle size of the colorant itself, or when an additive such as a dispersing agent is adhered onto the colorant, the particle size with the additive adhered. In the invention, as the device for measuring the volume average particle size, MICROTRUCK UPA particle size analysis meter 9340 (produced by Leeds & Northrup Corp.) is used. The measurement is carried out with 4 ml of an ink for an inkjet placed in a measurement cell according to a predetermined measuring method. As the parameters to be inputted at the time of the measurement, the viscosity of the ink for an inkjet is inputted as the viscosity, and the density of the colorant is inputted as the density of the dispersion particles Next, a water-soluble organic solvent will be mentioned. As a water-soluble organic solvent, polyhydric alcohols, a polyhydric alcohol derivative, a nitrogen-containing solvent, alcohols and a sulfur-containing solvent are used.

As specific examples of the water-soluble organic solvent, the polyhydric alcohols include ethylene glycol, diethylene glycol, propylene glycol, butylene glycol, triethylene glycol, 1,5-pentane diol, 1,2,6-hexane triol and glycerin.

Specific examples of the polyhydric alcohol derivative include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and the ethylene oxide adduct of diglycerin.

Specific examples of the nitrogen-containing solvent include pyrrolidone, N-methyl-2-pyrrolidone, cyclohexyl pyrrolidone, triethanol amine. Specific examples of the alcohols include ethanol, isopropyl alcohol, butyl alcohol, and benzyl alcohol. Specific examples of the sulfur-containing solvent include thiodiethanol, thiodiglycerol, sulfolane, and dimethyl sulfoxide.

In addition, it is also possible to use propylene carbonate and ethylene carbonate as a water-soluble organic solvent.

It is preferable that at least one kind of water-soluble organic solvent is used. The content of the water-soluble organic solvent to be used is 1% by mass or more and 60% by mass or less, and is preferably 5% by mass or more and 40% by mass or less. When the content of the water-soluble organic solvent in the ink is less than 1% by mass, a sufficient optical density cannot be obtained. To the contrary, when the content of the water-soluble organic solvent is more than 60% by mass, the viscosity of the liquid is increased so that the jet characteristic of the liquid becomes unstable.

Next, water will be explained. As the water, in order to prevent introduction of impurities, it is particularly preferable to use ion exchange water, ultra pure water, distilled water or ultrafiltrated water.

Next, other additives will be explained. A surfactant may be added to the ink.

As the kinds of the surfactants, various kinds of anionic surfactants, nonionic surfactants, cationic surfactants, and amphoteric surfactants, or the like are exemplified. Preferably, the anionic surfactants and the nonionic surfactants can be used.

Hereinafter, specific examples of the surfactant are mentioned.

Examples of the anionic surfactant may include alkylbenzenesulfonic acid salt, alkylphenylsulfonic acid salt, alkylnaphthalenesulfonic acid salt, higher fatty acid salt, sulfuric acid ester salt of higher fatty acid ester, sulfonic acid salt of higher fatty acid ester, sulfuric acid ester salt and sulfonic acid salt of higher alcohol ether, higher alkylsulfosuccinic acid salt, polyoxyethylenealkyl ethercarboxylic acid salt, polyoxyethylenealkyl ethersulfuric acid salt, alkylphosphoric acid salt and polyoxyethylenealkyl etherphosphoric acid salt, preferably dodecylbenzenesulfonic acid salt, isopropylnaphthalenesulfonic acid salt, monobutylphenylphenol monosulfonic acid salt, monobutylbiphenylsulfonic acid salt, monobutylbiphenylsulfonic acid salt and dibutylphenylphenoldisulfonic acid salt.

Examples of the nonionic surfactant may include polyoxyethylene alkyl ether, polyoxyethylene alkylphenyl ether, polyoxyethylene fatty acid ester, sorbitan fatty acid ester, polyoxyethylene sorbitan fatty acid ester, polyoxyethylene sorbitol fatty acid ester, glycerine fatty acid ester, polyoxyethyleneglycerine fatty acid ester, polyglycerine fatty acid ester, sucrose fatty acid ester, polyoxyethylenealkylamine, polyoxyethylene fatty acid amide, alkylalkanol amide, polyethyleneglycolpolypropyleneglycol block copolymer, acetylene glycol and polyoxyethylene adduct of acetylene glycol, preferably polyoxyethylene adducts such as polyoxyethylene nonyl phenyl ether, polyoxyethylene octyl phenyl ether, polyoxyethylene dodecyl phenyl ether, polyoxyethylene alkyl ether, polyoxyethylene fatty acid ester, sorbitan fatty acid ester, polyoxyethylene sorbitan fatty acid ester, fatty acid alkylol amide, polyethyleneglycol polypropyleneglycol block copolymer, acetylene glycol and polyoxyethylene adduct of acetylene glycol.

In addition, silicone surfactants such as polysiloxaneoxyethylene adduct, fluorine-based surfactants such as perfluoroalkyl carboxylic acid salt, perfluoroalkyl sulfonic acid salt and oxyethylene perfluoroalkyl ether, biosurfactants such as spiculisporic acid, rhamnolipid and lysolecithin.

These surfactants may be used solely or as a mixture. The HLB of the surfactant is preferably in the range of 3 to 20 in view of dissolving stability, or the like.

The amount of the surfactant to be added is preferably 0.001% by mass to 5% by mass, specifically preferably 0.01% by mass to 3% by mass.

Furthermore, additionally, various additives can be added to the ink, such as a permeating agent, or polyethylene imine, polyamines, a polyvinyl pyrrolidone, a polyethylene glycol, en ethyl cellulose, and a carboxy methyl cellulose, in order to adjust the permeation property, or in order to control the ink ejection property, and compounds of alkali metals such as a potassium hydroxide, a sodium hydroxide and a lithium hydroxide for adjusting the conductivity and the pH. As needed, a pH buffer, an antioxidant, a mildew preventing agent, a viscosity adjusting agent, a conductive agent, an ultraviolet ray absorbing agent, a chelating agent, or the like can be added as well.

Next, appropriate characteristics of the ink will be mentioned. First, it is preferable that the surface tension of the ink is in the range of from 20 mN/m to 60 mN/m.

The surface tension is more preferably in the range of from 20 mN/m to 50 mN/m, and is further preferably in the range of from 20 mN/m to 35 mN/m. When the surface tension is less than 20 mN/m, the ink overflows into a nozzle surface and printing may not be carried out normally. On the other hand, when the surface tension of the ink is higher than 60 mN/m, the permeating speed may be lower so that the drying time may be longer.

Here, as the surface tension, the value measured under the conditions of 23° C., and 55% RH by the use of the WILLHERMY type surface tension meter (produced by Kyowa Kaimen Kagaku Corp.) is used.

The viscosity of the ink is preferably in the range of from 1.2 mPa·s to 30 mPa·s, is more preferably in the range of from 1.2 mPa·s to 20 mPa·s, and is further preferably in the range of from 1.5 mPa·s to 15 mPa·s. When the viscosity of the ink is more than 10 mPa·s, an ejecting property may be deteriorated.

Here, as the viscosity, the value measured at the temperature of 23° C. and at the shearing speed of 1,400 $s^{-1}$, using REOMAT 115 (produced by Contraves) as the measurement device is used.

Moreover, the number of particles of 5 μm or more in 1 μl of the ink is preferably 100 or less, more preferably 80 or less, and further preferably 50 or less. If the number of particles of 5 μm or more in the ink is too large, problems such as ink non-ejection, or the like may occur.

Here, the number of particles of 5 μm or more in 1 μl of the ink is measured using Accusizer TM 770 Optical Particle Sizer (produced by particle Sizing Systems Corp.). Moreover, as the parameter to be inputted at the time of the measurement, the density of the colorant is inputted as the density of the dispersion particles.

The $\zeta$ potential of the ink is preferably 10 to 100 mV or less as the absolute value, more preferably 10 to 90 mV, and further preferably 15 to 80 mV. When the $\zeta$ potential is lower than 10 mV as the absolute value, the water resisting property may be lowered. Furthermore, when the ink is used in combination with a processing liquid, the image quality may not be improved without ensuring the aggregating property of the pigment. On the other hand, when the ζ potential is higher than 100 mV as the absolute value, the ink storability may not be ensured.

The ζ potential, is calculated using the following calculation equation after the measurement using ESA-8000 (produced by Matec Applied Science Corp.) as the measurement device according to the ESA method (Electrokinetic Sonic Amplitude method).

$$\zeta\ potential = [ESA \times \eta \times G(\alpha)^{-1}]/[\epsilon \times c \times \Delta\rho \times V]$$

In the equation, ESA denotes the pressure per unit electric field, which is a value obtained by the measurement. $\eta$ is the viscosity of a solvent, $G(\alpha)^{-1}$ is a correction term by the inertia force, s is the dielectric constant, and c is the sonic velocity in the solvent, $\Delta\rho$ is the density difference between the solvent and the particles, and V is the volume percentage of the particles. In the invention, the measurement is carried out according to a predetermined measurement method at the temperature of 22.0° C. Furthermore, as the parameters used at the time of calculating the zeta potential, the viscosity of the ink as $\eta$, the dielectric constant of the water as $\epsilon$, the sonic velocity in the water as c, the concentration difference between the pigment and the water as $\Delta\rho$, and the volume percentage of the pigment as V are used.

Hereinafter, the processing liquid (the processing liquid for inkjet of the invention) will be explained in detail.

The processing liquid contains in addition to the non-linear polymer, at least a component having the function of aggregating or insolubilizing the ink component (hereinafter referred to as the aggregating component), a water-soluble organic solvent and water.

The aggregating component is preferably a substance capable of aggregating or insolubilizing the non-linear polymer when the aggregating component is mixed with the ink. For example, a substance capable of insolubilizing by oxidizing the anion group of the non-linear polymer (for example, an organic acid), and a substance capable of aggregating by generating the ion cross linking with the anion group of the non-linear polymer (polyvalent metal salt or a cationic compound) can be exemplified. Moreover, the aggregating component may be a substance having the function of enlarging the particle size of the colorant, or a substance having the function of insolubilizing the colorant component of the ink.

The aggregating components having such a function preferably include inorganic electrolytes, organic acids, inorganic acids, organic amines (cationic compound), or the like.

The inorganic electrolyte includes an alkali metal ion such as a lithium ion, a sodium ion, a potassium ion, a polyvalent metal ion such as an aluminum ion, a barium ion, a calcium ion, a copper ion, an iron ion, a magnesium ion, a manganese ion, a nickel ion, a tin ion, a titanium ion and a zinc ion, hydrochloric acid, hydrobromic acid, hydriodic acid, sulfuric acid, nitric acid, phosphoric acid, thiocyanic acid, and organic carboxylic acid such as acetic acid, oxalic acid, lactic acid, fumaric acid, citric acid, salicylic acid and benzoic acid, and organic sulfonic acid salts.

Specific examples include an alkali metal salt such as lithium chloride, sodium chloride, potassium chloride, sodium bromide, potassium bromide, sodium iodide, potassium iodide, sodium sulfate, potassium nitrate, sodium acetate, potassium oxalate, sodium citrate, and potassium benzoate, and a polyvalent metal salt such as aluminum chloride, aluminum bromide, aluminum sulfate, aluminum nitrate, aluminum sodium sulfate, aluminum potassium sulfate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogenphosphate, calcium thiocyanate, calcium benzoate, calcium acetate, calcium salicylate, calcium tartrate, calcium lactate, calcium fumarate, calcium citrate, copper chloride, copper bromide, copper sulfate, copper nitrate, copper acetate, iron chloride, iron bromide, ion iodide, iron sulfate, iron nitride, iron oxalate, iron lactate, iron fumarate, iron citrate, magnesium chloride, magnesium bromide, magnesium iodide, magnesium sulfate, magnesium nitrate, magnesium acetate, magnesium lactate, manganese chloride, manganese sulfate, manganese nitrate, manganese dihydrogenphosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc nitrate, zinc thiocyanate, and zinc acetate.

Examples of the organic acid include arginine acid, citric acid, glycine, glutamic acid, succinic acid, tartaric acid, cysteine, oxalic acid, fumaric acid, phthalic acid, maleic acid, malonic acid, lycine, malic acid, the compounds represented by Formula (1), and the derivatives of the compounds.

In the Formula (1), X represents O, CO, NH, $NR_1$, S or $SO_2$. $R_1$ represents an alkyl group and $R_1$ is preferably $CH_2$, $C_2H_5$ and $C_2H_4OH$. R represents an alkyl group and R is preferably $CH_2$, $C_2H_5$ and $C_2H_4OH$. R may be or may not be included in the Formula. X is preferably CO, NH, NR and O, and more preferably CO, NH and O. X is preferably CO, NH, NR and O, and more preferably CO, NH and O. M represents a hydrogen atom, an alkali metal or amines. M is preferably H, Li, Na, K, monoethanol amine, diethanol amine or triethanol amine, is more preferably H, Na, and K, and is further preferably a hydrogen atom. n represents an integer of 3 to 7, preferably a heterocyclic ring having six-membered ring or five-membered ring, and more preferably the heterocyclic ring having five-membered ring. m represents 1 or 2. A compound represented by the Formula (1) is a saturated ring or an unsaturated ring when the compound is the heterocyclic ring. l represents an integer of 1 to 5.

Specific examples of the compound represented by the Formula (1) include the compound having furan, pyrrole, pyrroline, pyrrolidone, pyrone, pyrrole, thiophene, indole, pyridine, and quinoline structures, and furthermore, a compound having a carboxyl group as a functional group. Specific examples of the compound include 2-pyrrolidone-5-carboxylic acid, 4-methyl-4-pentanolide-3-carboxylic acid, furan carboxylic acid, 2-benzofuran carboxylic acid, 5-methyl-2-furan carboxylic acid, 2,5-dimethyl-3-furan carboxylic acid, 2,5-furan dicarboxylic acid, 4-butanolide-3-carboxylic acid, 3-hydroxy-4-pyrone-2,6-dicarboxylic acid, 2-pyrone-6-carboxylic acid, 4-pyrone-2-carboxylic acid, 5-hydroxy-4-pyrone-5-carboxylic acid, 4-pyrone-2,6-dicarboxylic acid, 3-hydroxy-4-pyrone-2,6-dicarboxylic acid, thiophene carboxylic acid, 2-pyrrole carboxylic acid, 2,3-dimethyl pyrrole-4-carboxylic acid, 2,4,5-trimethyl pyrrole-3-propionic acid, 3-hydroxy-2-indole carboxylic acid, 2,5-dioxo-4-methyl-3-pyrroline-3-propionic acid, 2-pyrrolidine carboxylic acid, 4-hydroxyproline, 1-methylpyrrolidine-2-carboxylic acid, 5-carboxy-1-methyl pyrrolidine-2-acetic acid, 2-pyridine carboxylic acid, 3-pyridine carboxylic acid, 4-pyridine carboxylic acid, pyridine dicarboxylic acid, pyridine tricarboxylic acid, pyridine pentacarboxylic acid, 1,2,5,6-tetrahydro-1-methyl nicotinic acid, 2-quinoline carboxylic acid, 4-quinoline carboxylic acid, 2-phenyl-4-quinoline carboxylic acid, 4-hydroxy-2-quinoline carboxylic acid, and 6-methoxy-4-quinoline carboxylic acid.

Preferably, the organic acid includes citric acid, glycine, glutamic acid, succinic acid, tartaric acid, phthalic acid, pyrrolidone carboxylic acid, pyrone carboxylic acid, pyrrole carboxylic acid, furan carboxylic acid, pyridine carboxylic acid, coumalic acid, thiophene carboxylic acid, nicotinic acid, or the derivatives or salts of the compounds. More preferably, the organic acid includes the pyrrolidone carboxylic acid, the pyrone carboxylic acid, the pyrrole carboxylic acid, the furan carboxylic acid, the pyridine carboxylic acid, the coumalic acid, the thiophene carboxylic acid, the nicotinic acid, or the derivatives or salts of the compounds. Further preferably, the organic acid includes the pyrrolidone carboxylic acid, the pyrone carboxylic acid, the furan carboxylic acid, the coumalic acid, or the derivatives or salts of the compounds.

An organic amine compound may be any of a primary amine, secondary amine, tertiary amine, quaternary amine and the salts thereof. Specific examples include a tetraalkyl ammonium, alkylamine, benzaconium, alkylpyridium, imidazolium, polyamine and their derivatives or salts. Specific examples include amyl amine, butyl amine, propanol amine, propyl amine, ethanol amine, ethyl ethanol amine, 2-ethyl hexyl amine, ethyl methyl amine, ethyl benzyl amine, ethylene diamine, octyl amine, oleyl amine, cyclooctyl amine, cyclobutyl amine, cyclopropyl amine, cyclohexyl amine, diisopropanol amine, diethanol amine, diethyl amine, di-2-ethylhexyl amine, diethylene triamine, diphenyl amine, dibutyl amine, dipropyl amine, dihexyl amine, dipentyl amine, 3-(dimethyl amino) propyl amine, dimethyl ethyl amine, dimethyl ethylene diamine, dimethyl octyl amine, 1,3-dimethyl butyl amine, dimethyl-1, 3-propane diamine, dimethyl hexyl amine, amino butanol, amino propanol, amino propane diol, N-acetyl amino ethanol, 2-(2-amino ethyl amino)-ethanol, 2-amino-2-ethyl-1,3-propane diol, 2(2-amino ethoxy) ethanol, 2-(3,4-dimethoxy phenyl) ethyl amine, cetyl amine, triisopropanol amine, triisopentyl amine, triethanol amine, trioctyl amine, triethyl amine, bis (2-aminoethyl) 1,3-propane diamine, bis (3-aminopropyl) ethylene diamine, bis (3-aminopropyl) 1,3-propane diamine, bis (3-amino propyl) methyl amine, bis (2-ethyl hexyl) amine, bis (trimethyl silyl) amine, butyl amine, butyl isopropyl amine, propane diamine, propyl diamine, hexyl amine, pentyl amine, 2-methyl-cyclohexyl amine, methyl-propyl amine, methyl benzyl amine, monoethanol amine, lauryl amine, nonyl amine, trimethyl amine, triethyl amine, dimethyl propyl amine, propylene diamine, hexamethylene diamine, tetraethylene pentamine, diethyl ethanol amine, tetramethyl ammonium chloride, tetraethyl ammonium bromide, dihydroxy ethyl stearyl amine, 2-heptadecenyl-hydroxyethyl imidazoline, lauryl dimethyl benzyl ammonium chloride, cetylpyridinium chloride, stearamid methyl pyridium chloride, a diaryl dimethyl ammonium chloride polymer, a diaryl amine polymer, and a monoaryl amine polymer.

More preferably, there are used triethanol amine, triisopropanol amine, 2-amino-2-ethyl-1,3-propanediol, ethanol amine, propane diamine, and propyl amine.

Among these aggregating components, the organic acids (for example, the compounds represented by the Formula (1)), polyvalent metal salts ($Ca(NO_3)$, $Mg(NO_3)$, $Al(OH_3)$, a polyaluminum chloride, or the like), cationic compounds (polyallyl amine, cationic cellulose, guargum, casein, collagen, or the like) are preferable because these components are capable of suitably aggregating or insolubilizing the non-linear polymer.

The aggregating components may either be used alone or as a mixture of two or more kinds. Moreover, the content of the aggregating component is preferably 0.01% by mass or more and 30% by mass or less. More preferably, it is 0.1% by mass or more and 15% by mass or less, and further preferably it is 1% by mass or more and 15% by mass or less. In the case the addition amount of the aggregating component is less than 0.01% by mass, the aggregation of the colorant is insufficient at the time of contact with the ink so that the optical density, blurring and blurring among the colors may be poorer. On the other hand, in the case the addition amount is more than 30% by mass, the jetting characteristics are lowered so that the liquid may not be jetted normally.

For a processing liquid, a water-soluble organic solvent which is the same as the ink may be used. The content of the water-soluble organic solvent to be used is equal to or more than 1% by mass and is equal to or less than 60% by mass, and is preferably equal to or more than 5% by mass and equal to or less than 40% by mass. In some cases in which the amount of the water-soluble organic solvent in the liquid is less than 1% by mass, a sufficient optical density cannot be obtained. To the contrary, in some cases in which the amount of the water-soluble organic solvent is more than 60% by mass, the viscosity of the liquid is increased so that the jet characteristic of the liquid becomes unstable.

Here, the ink or the processing liquid may include a plasticizing agent. By including a plasticizing agent, since it can enter between the molecules of the non-linear polymer so as to soften the non-linear polymer and improve the fixing property as well as the excellent rub resistance can be obtained.

As the plasticizing agent, known plasticizing agent for resins can be used without any particular limitation. For introducing the plasticizing agents into the non-linear polymer so as to provide a plasticizing property and from the viewpoint of obtaining an image having an excellent rub resistance, it is preferable that the difference of the SP value of the plasticizing agent and the SP value of the non-linear polymer (dissolving property parameter) is 2.0 or less. When the difference in the SP value is preferably 1.0 or less and further preferably 0.5 or less, the mutual solubility of the plasticizing agent and the non-linear polymer is further increased so that an image having the excellent rub resistance can be obtained owing to layer formation. The plasticizing agent can be selected with reference to the "Chemistry Handbook(KAGAKU BINRAN)" (compiled by Japan Chemistry Association, published by Maruzen), "Plasticizing agent—its theory and application" (written and compiled by Koichi Murai, published by Saiwai Shobo), "Study of the plasticizers vol. 1", "Study of the plasticizers vol. 2" (compiled by Polymer Chemistry Association), "Handbook for Rubber-Plastic Formulation Chemicals" (compiled by Rubber Digest Corp.), or the like.

Here, as the SP value, the value obtained by the Fedors method is used. The Fedors method is described in detail in Fedors, R. F., "Polymer Eng. Sci.", 14. P. 147 (1974). Specifically, it is calculated using the following Equation $$SP = \sqrt{\frac{\Delta E}{V}} = \sqrt{\frac{\sum_i \Delta ei}{\sum_i \Delta vi}} \quad \text{[Equation 1]}$$

$$\text{Unit:} \sqrt{cal/cm^3} \ (= 0.489 \times \sqrt{J/cm^3})$$

In the above Equation, ΔE represents an aggregation energy density, V represents a molar volume, Δei represents an evaporation energy of an atom or atomic group, and Δvi represents a molar volume. Moreover, the value of the molar volume in the Equation is calculated as the molecular weight/specific gravity. The value of the specific gravity is the value at 25° C.

Although the plasticizing agent may be disclosed as a high boiling point organic solvent or a thermal solvent, for example, the compounds including the esters (such as phthalates, phosphates, fatty acid esters, abiethinates, adipates, cebacates, azelates, benzoates, lactates, epoxy fatty acid esters, glycolates, propionates, trimeritates, citrates, sulfonates, carboxylates, succinates, maleates, fumarates, phthalates, and stearates), the amides (such as fatty acid amides, and sulfonamides), the ethers (weight average molecular weight (M. W.) 200 or more), alcohols (weight average molecular weight (M. W.) 200 or more), lactones, polyethyleneoxides, or the like as disclosed in JP-A Nos. 59-83154, 59-178451, 59-178453, 59-1-78454, 59-178455, 59-178457, 62-174754, 62-245253, 61-209444, 61-200538, 62-8145, 62-9348, 62-30247, 62-136646, 62-174754, 62-245253, 61-209444, 61-200538, 62-8145, 62-9348, 62-30247, 62-136646, 2-235694, or the like, are exemplified.

As the plasticizing agents, polymers having a relatively low molecular weight can be used as well. In this case, the molecular weight of the plasticizing agent is 15,000 or less as the weight average molecular weight, and preferably 5,000 or less. Furthermore, the oligomers can also be used as a plasticizer. In addition to the compounds mentioned above, as the commercially available products, for example, ADEKACIZER PN-170, PN-1430 produced by Asahi Denka Kogyo; PARAPLEX G-25, G-30, G-40 produced by C. P. HALL Corp.; ESTERGAM 8L-JA, ESTER R-95, PENTARIN 4851, FK115, 4820, 830, RUIZOL 28-JA, PIKORASTIC A75, PIKORATEX LC, KURISUTAREX 3085 produced by RIKA HERCURES, or the like can be presented.

For example, aqueous solvents having a 9 to 11 SP value such as butyl carbitol, diethylene glycol monoethyl ether and triethylene glycol, can also be used as a plasticizing agent.

The plasticizing agent is preferably at least one kind selected form the group consisting of aliphatic esters, acetates, trimeritates, and orthophosphates. Among these esters, aliphatic esters are more preferable, and butyl carbitol, dimethyl adipate, and diethyl succinate are particularly preferable.

The content of the plasticizing agent is preferably 0.01% by mass or more and 30% by mass or less. It is more preferably 0.05% by mass or more and 15% by mass or less, and it is further preferably 0.1% by mass or more and 10% by mass or less. In the case the plasticizing agent amount is too small, the polymer softening property of the polymer may not be obtained sufficiently. On the other hand, in the case it is too large, due to the large viscosity of the liquid, the liquid jetting characteristics may be unstable.

Here, according to the invention, the so-called thick and thin inks having different concentrations may also be used. In this case, it is preferable to add an aggregating component to the ink having a low pigment concentration so as to be used as a processing liquid. It is considered that the pigment aggregation can be restrained by allowing the pigment concentration lower so as to improve the ink storability.

In order to lower the interaction between the self dispersing pigment and the aggregating component in the processing liquid to improve the ink storability, a chelating agent may be added to the processing liquid. However, as the chelating agent to be used here, it is preferable to select a compound to impart an readily soluble property in water to the chelated compound of the aggregating component and the chelating agent.

The chelating agents include, for example, ethylene diamine, ethylene diamine tetraacetic acid, 1,2-propylene diamine tetraacetic acid, 1-phenyl ethylene diamine tetraacetic acid, 3,3-dimethyl butane-1,2-diamine tetraacetic acid, 1,2,3-triaminopropane hexaacetic acid, trimethylene diamine tetraacetic acid, nitrilo triacetic acid, 1,2-cyclohexane diamine tetraacetic acid, diethylene triamine pentaacetic acid, glycol ethylene diamine tetraacetic acid, triethylene tetramine hexaacetic acid, triethylene tetramine, tetraethylene pentamine, propane-1,2-diamine, butane-1,2-diamine, 3,3-dimethyl butane-1,2-diamine, 1,2,3-triamino propane, trimethylene diamine, tetralin-2,3-diamine tetraacetic acid, decalin-2,3-tetraacetic acid, cyclohexane-1,2-diamine tetraacetic acid, cyclohexane-1,3-diamine tetraacetic acid, cyclohexane-1,4-diamine tetraacetic acid, oxalic acid, tylon, acetyle acetone, or the like, but are not limited thereto.

Although it is not particularly limited, the solubility of the chelated compound formed by the aggregating component and the chelating agent in water at 23° C. is preferably 0.1 g/L or more.

Additionally, it is also possible to add a polymer dispersing agent to be used for the ink to the processing liquid. Moreover, the other additives same as those for the ink can be added to the processing liquid, as well.

As to the surface tension and the viscosity of the processing liquid, it is preferable to have the same characteristics as those of the ink.

Here, the number of coarse particles having a size of 5 μm or more in the liquid mixture of the ink and the processing liquid is preferably 1,000 pieces/μL or more, more preferably 2,500 pieces/μL or more, further preferably 5,000 pieces/μL or more. When the number of coarse particles having a size of 5 μm or more in the liquid mixture of the ink and the processing liquid is less than 1,000 pieces/μL, the optical density may be lowered.

The number of coarse particles having the size of 5 μm or more in the liquid mixture of the ink and the processing liquid is determined by mixing the two liquids at the ratio of 1:1 by mass, sampling 2 μL therefrom while agitating and measuring the sample by using Accusizer TM770 Optical Particle Sizer (produced by Particle Sizing Systems Corp.). As the parameter at the time of the measurement, the colorant density is inputted as the dispersion particle density. The density of the colorant fine particles can be determined by measuring the powdery substance obtained by heating and drying the ink by the use of a density gauge, a pycnometer, or the like.

Moreover, the viscosity of the liquid mixture of the ink and the processing liquid (1:0.5 by mass) is preferably 6.0 mPa·s or more, and more preferably 8.0 to 25.0 mPa·s or more. If the viscosity is too low, the optical density may be lowered. On the other hand, if the viscosity is too high, the aggregating force and the thickening force are too high so that the ink spreading is suppressed and white streaks, or the like may be formed.

(Ink Set Tank for Inkjet)

The ink set tank for inkjet of the invention (including the ink tank for an inkjet and the processing liquid tank) accommodates the liquids (the ink for an inkjet or the processing liquid of the invention) of the ink set for an inkjet of the invention as mentioned above. For example, the ink tank disclosed in JP-A No. 2001-138541, or the like can be used. In this case, when the ink tank is filled with the ink and the ink is ejected from the recording head, the change in the ink characteristic over a long term storage in the ink tank can be suppressed so that, in particular, the ink ejecting property from the recording head after the ink has been stored in the tank for a long period of time can become sufficiently satisfactory.

(Inkjet Recording Method, Inkjet Recording Apparatus)

The inkjet recording method of the invention is a method for forming an image by ejecting the liquids onto a recording medium using an ink set for an inkjet. Specifically, it is a method for printing in which the ink for an inkjet and the processing liquid are brought into contact with each other.

The inkjet recording apparatus of the present invention has a recording head which ejects each liquid onto a recording medium using an ink set for an inkjet. These elements can be used not only for ordinary inkjet recording apparatuses, but also for recording apparatuses having a heater or the like for controlling drying of ink, and for apparatuses having an intermediate transfer mechanism in which printing is performed on an intermediate body followed by transferring the print onto a recording medium such as paper.

In the inkjet recording method (inkjet recording apparatus) of the present invention, the liquid volume per one liquid drop is preferably from 1 pL to 200 pL, more preferably, 1 pL to 100 pL, and still more preferably 1 pL to 80 pL. When the liquid volume per one liquid drop exceeds 200 pL, the resolution of an image may become deteriorated. It is considered that the deterioration of the image resolution is caused by a tendency of readily spreading of the liquid drop over the recording medium (paper) surface as the liquid volume per one liquid drop (drop amount) increases, due to the change in the contact angles of the ink and processing liquid on the surface of the recording medium depending on the liquid volume per one liquid drop.

In an inkjet apparatus capable of jetting drops having a plurality of volumes from one nozzle, the amount of the drop indicates the amount of a minimum drop capable of carrying out printing.

Moreover, when an ink set for an inkjet is used, the ink for an inkjet and the processing solution are applied onto the recording medium in order to come into contact with each other. When the ink for an inkjet and the processing liquid come into contact with each other, an ink is aggregated due to the action of the aggregating agent. Thus, it is possible to obtain a recording method which provide an excellent color forming property, an excellent even solid color, optical density, ink bleed, intercolor blur and drying time. As long as the ink and the aggregating agent are in contact with each other, they may be applied adjacently to each other or may be covered with each other.

Regarding the order of application of the ink and the aggregating agent onto the recording medium, the processing liquid is applied and thereafter, the ink for an inkjet is applied. By applying the processing liquid earlier, it is possible to effectively aggregate the components in the ink for inkjet. The ink for inkjet may be applied at any time after the processing liquid is applied. It is preferable that the ink for inkjet may be applied after 0.5 second or less after the application of the processing liquid.

In the inkjet recording method (apparatus) according to the invention, it is preferable that a mass ratio of the amount of application of the ink for an inkjet to the amount of application of the processing liquid which is required for forming one pixel is 1:20 to 20:1. The mass ratio is more preferably 1:10 to 10:1 and is further preferably 1:5 to 5:1. When the amount of application of the ink for inkjet is too small or too large as compared with the amount of application of the processing liquid, the aggregation becomes insufficient so that the optical density is reduced, the blur is caused more seriously and the intercolor blur is deteriorated. The pixel refers to a lattice point formed when a desirable image is divided into a minimum distance where the ink can be applied in a main scanning direction and a sub-scanning direction. By giving a proper ink set to each pixel, a color and an image density can be regulated and an image is thus formed.

In particular, the ration of the application amount of the processing liquid to the application amount of the ink for an inkjet necessary for forming one pixel is preferably 60% by volume or less based on the volume ratio, more preferably 5 to 50% by volume and particularly preferably 10 to 30% by volume.

It is preferable that the inkjet recording method (apparatus) according to the invention is used for a thermal inkjet recording system or a piezo inkjet recording system in light of the effect for improving bleed and intercolor bleed. Although reason has not been yet clear, an ink is heated when the ink is ejected so that the viscosity of the ink is reduced in the case of the thermal inkjet recording system, and the temperature of the ink decreases on the recording medium so that the viscosity is suddenly increased. Therefore, it can be presumed that there is an effect of improving bleed and an intercolor bleed. On the other hand, in case of the piezo inkjet system, the liquid having a high viscosity can be ejected. It is possible to suppress the spread of the liquid having a high viscosity over the recording medium in the direction of the surface of the paper.

Consequently, it is presumed that there is an effect of improving the bleed and the intercolor bleed.

In the inkjet recording method (apparatus) of the present invention, the ink and the processing liquid are preferably replenished (supplied) to the recording head from the ink tanks (including processing liquid tank) filled with the ink and processing liquid, respectively. The ink tanks are preferably cartridge type ink tanks which are detachably mounted to the apparatus, and the ink and the processing liquid can readily supplied by replacing the cartridge type ink tanks.

Preferred embodiments of the inkjet recording apparatus according to the invention will be described below in detail with reference to the drawings. In the drawings, numerals having substantially the same functions have the same reference numerals and repetitive description will be omitted.

Figure 1:
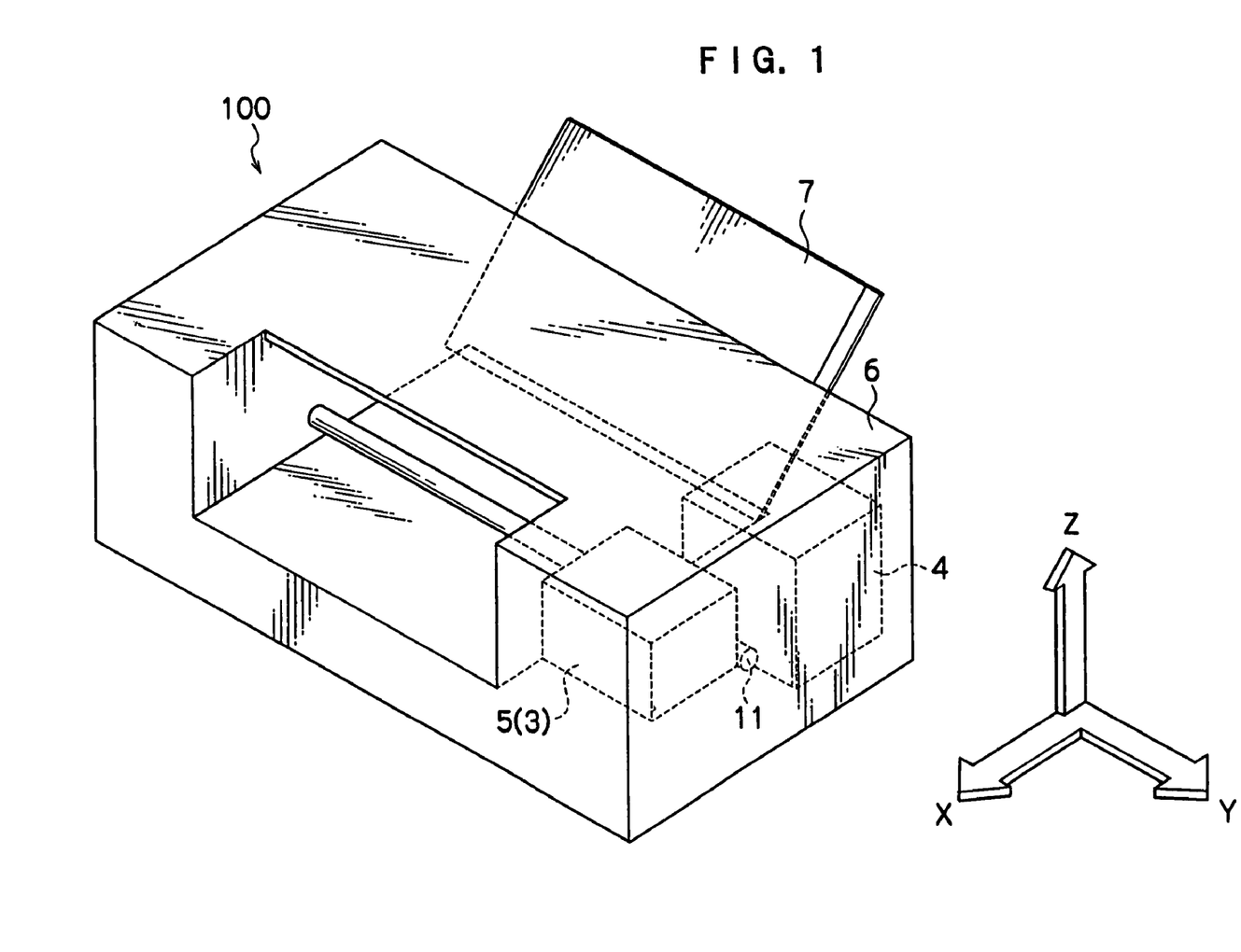
FIG. 1 is a perspective view showing an external appearance configuration of a preferable embodiment of an inkjet recording apparatus of the present invention.
Figure 2:
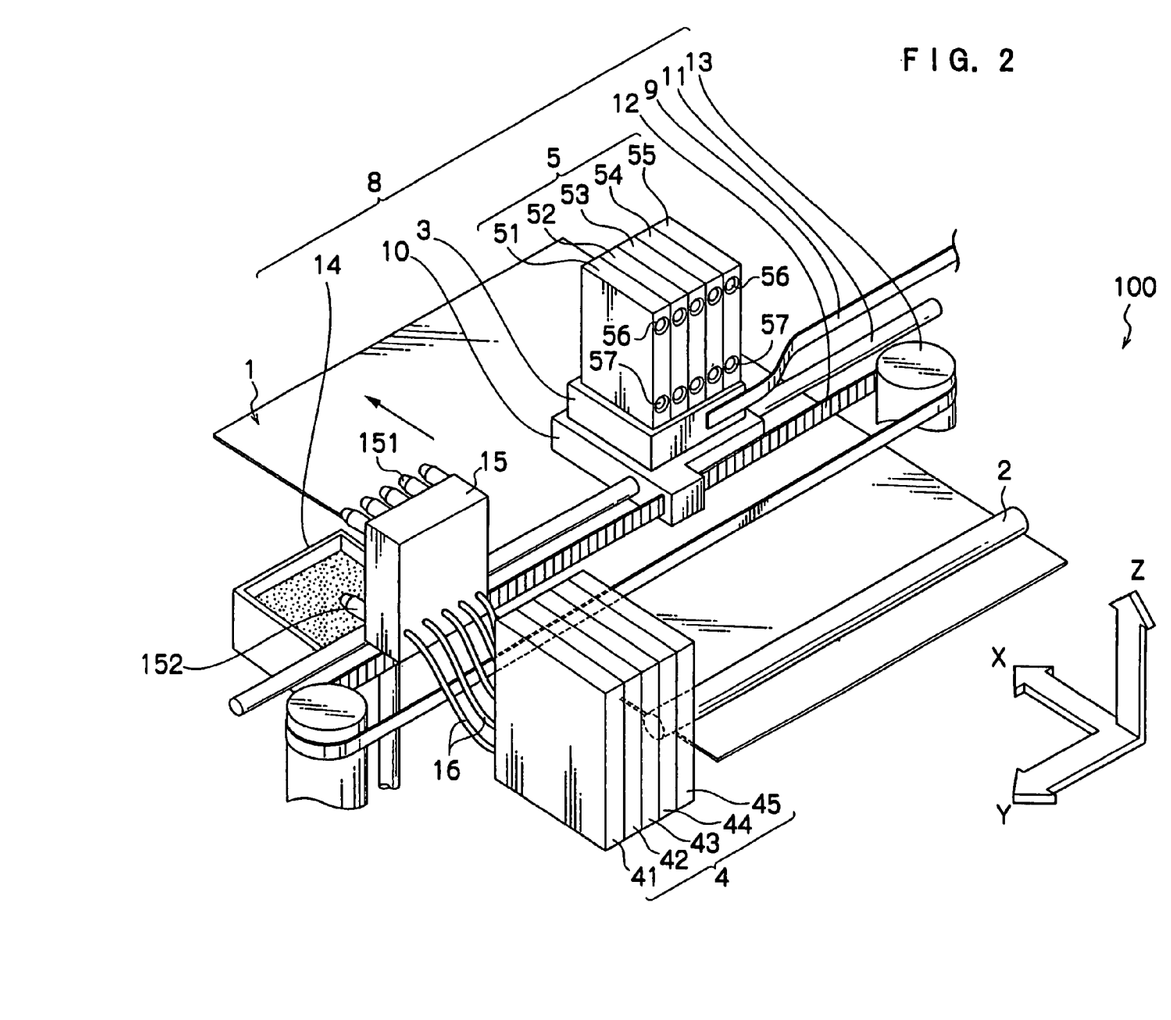
FIG. 2 is a perspective view showing the basic configuration of the inside of the inkjet recording apparatus of FIG. 1.

FIG. 1 is a perspective view showing the structure of an external appearance according to a preferred embodiment of the inkjet recording apparatus of the present invention. FIG. 2 is a perspective view showing the basic structure of the interior of the inkjet recording apparatus (which will be hereinafter referred to as an image forming apparatus) in FIG. 1.

An image forming apparatus 100 according to the embodiment has such a structure as to be operated to form an image based on the inkjet recording method according to the invention. More specifically, as shown in FIGS. 1 and 2, the image forming apparatus 100 is mainly constituted by an external cover 6, a tray 7 capable of loading a predetermined amount of a recording medium 1 such as a plain paper, a feed roller (delivery means) 2 for feeding the recording medium 1 for each sheet into the image forming apparatus 100, an image forming portion 8 (image forming means) for ejecting an ink and a processing liquid to the surface of the recording medium 1, thereby forming an image, and a main ink tank 4 which supplies the ink and the processing liquid to each sub-ink tank 5 on the image forming portion 8.

The feed roller 2 is a paper feeding mechanism constituted by a pair of rollers provided rotatably in the image forming apparatus 100, and the pair of the rollers nip the recording medium 1 loaded on the tray 7 and feed the recording medium 1 in a predetermined number into the image forming apparatus 100 for each sheet at a predetermined timing.

The image forming portion 8 forms an image with an ink over the surface of the recording medium 1. The image forming portion 8 is mainly constituted by a recording head 3, a sub-ink tank 5, a feeding signal cable 9, a carriage 10, a guide rod 11, a timing belt 12, a driving pulley 13, and a maintenance unit 14.

The sub-ink tank 5 has sub-ink tanks 51, 52, 53, 54 and 55 which store inks or processing liquids having different colors from each other so as to be ejected from the recording head. These tanks accommodate a black ink (K), a yellow ink (Y), a magenta ink (M) and a cyan ink (C) as a first liquid and a processing liquid as a second liquid, which are supplied from the main ink tank 4, for example.

Each tank of sub-ink tank 5 has a vent hole 56 and a supplying hole 57. When the recording head 3 moves to a standby position (or a supplying position), a bent pin 151 and a supplying pin 152 of a supplying device 15 are inserted into the vent hole 56 and the supplying hole 57, respectively, so that the sub-ink tank 5 and the supplying device 15 can be connected to each other. The supplying device 15 is connected to the main tank 4 through a supplying tube 16, and the ink or the processing liquid is supplied from the main ink tank 4 to the sub-ink tank 5 through the supplying hole 57.

The main ink tank 4 is composed of main ink tanks 31, 42, 43 and 44, which are filled with the black ink (K), the yellow ink (Y), the magenta ink (M) and the cyan ink (C) as the first liquid, and the processing liquid as the second liquid, and are detachably housed in the image forming apparatus 100.

Furthermore, a signal supplying cable 9 and the sub-ink tank 5 are connected to the recording head 3. When external image recording information is inputted from the signal supplying cable 9 to the recording head 3, the recording head 3 sucks an ink in a predetermined amount from each of the ink tanks and ejects the ink onto the surface of the recording medium based on the image recording information. The signal supplying cable 9 also serves as a power supplier necessary for driving the recording head 3 to the recording head 3 in addition to the image recording information.

Moreover, the recording head 3 is provided and held on the carriage 10, and the guide rod 11 and the timing belt 12 connected to the driving pulley 13 are connected to the carriage 10. By such a structure, the recording head 3 can also be moved in a direction Y (a scanning direction) which is parallel with the surface of the recording medium 1 and is perpendicular to a delivery direction X (a sub-scanning direction) of the recording medium 1 along the guide rod 11.

The image forming apparatus 100 comprises a control means (not shown) for controlling the driving timing of the recording head 3 and the driving timing of a carriage 10 in accordance with the image recording information. Consequently, it is possible to continuously form an image in accordance with the image recording information in a predetermined region on the surface of the recording medium 1 which is transported at a predetermined speed in the transporting direction X.

The maintenance unit 14 is connected to a pressure reducing device (not shown) through a tube. Furthermore, the maintenance unit 14 is connected to the nozzle portion of the recording head 3 and functions to reduce the pressure in the interior of the nozzle of the recording head 3, thereby sucking an ink from the nozzle of the recording head 3. By providing the maintenance unit 14, it is possible to remove an excessive ink in the nozzle during the operation of the image forming apparatus 100, if necessary, or to suppress the evaporation of the ink from the nozzle in a non-operated state.

Figure 3:
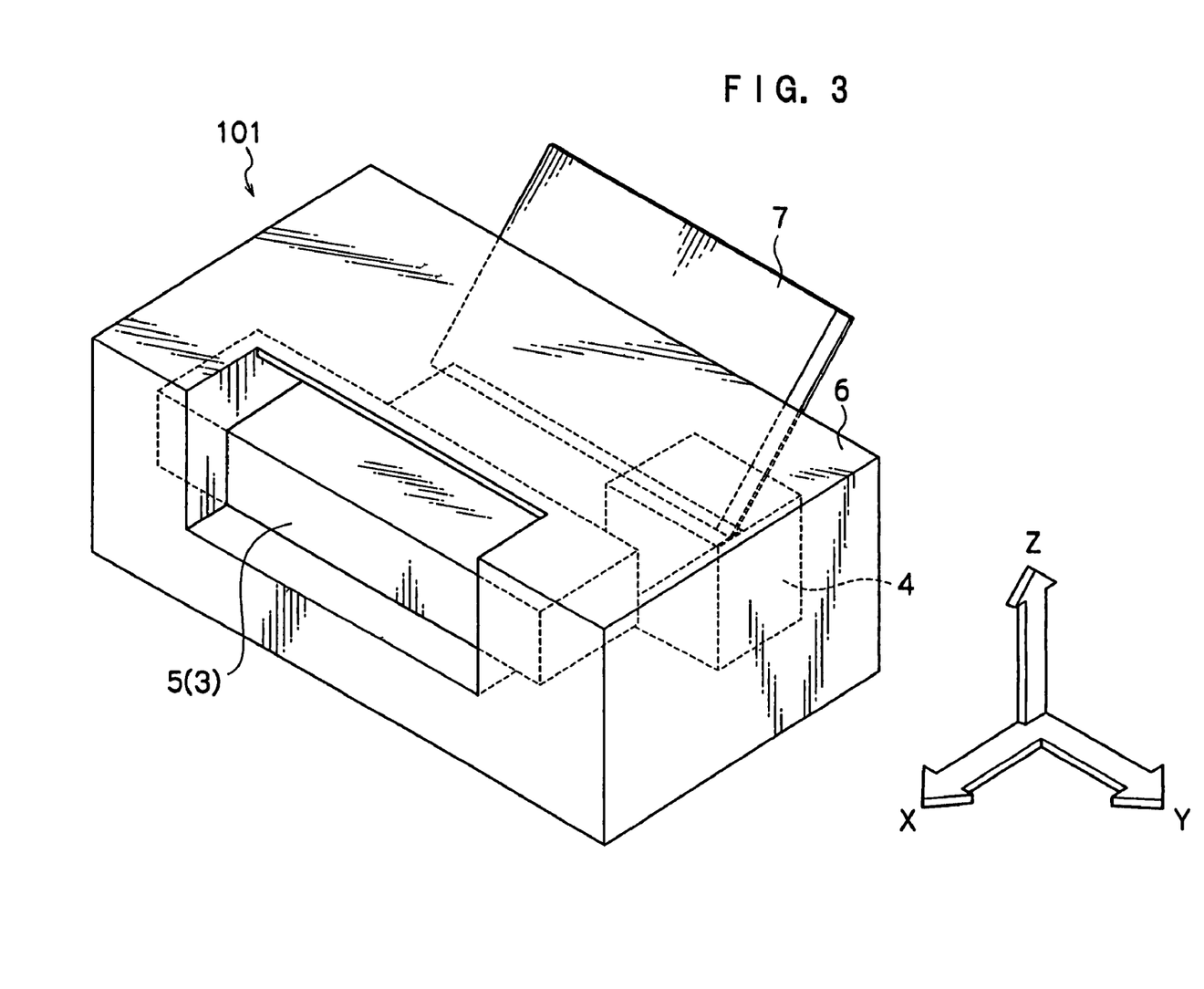
FIG. 3 is a perspective view showing the external appearance configuration of another preferable embodiment of an inkjet recording apparatus of the invention.
Figure 4:
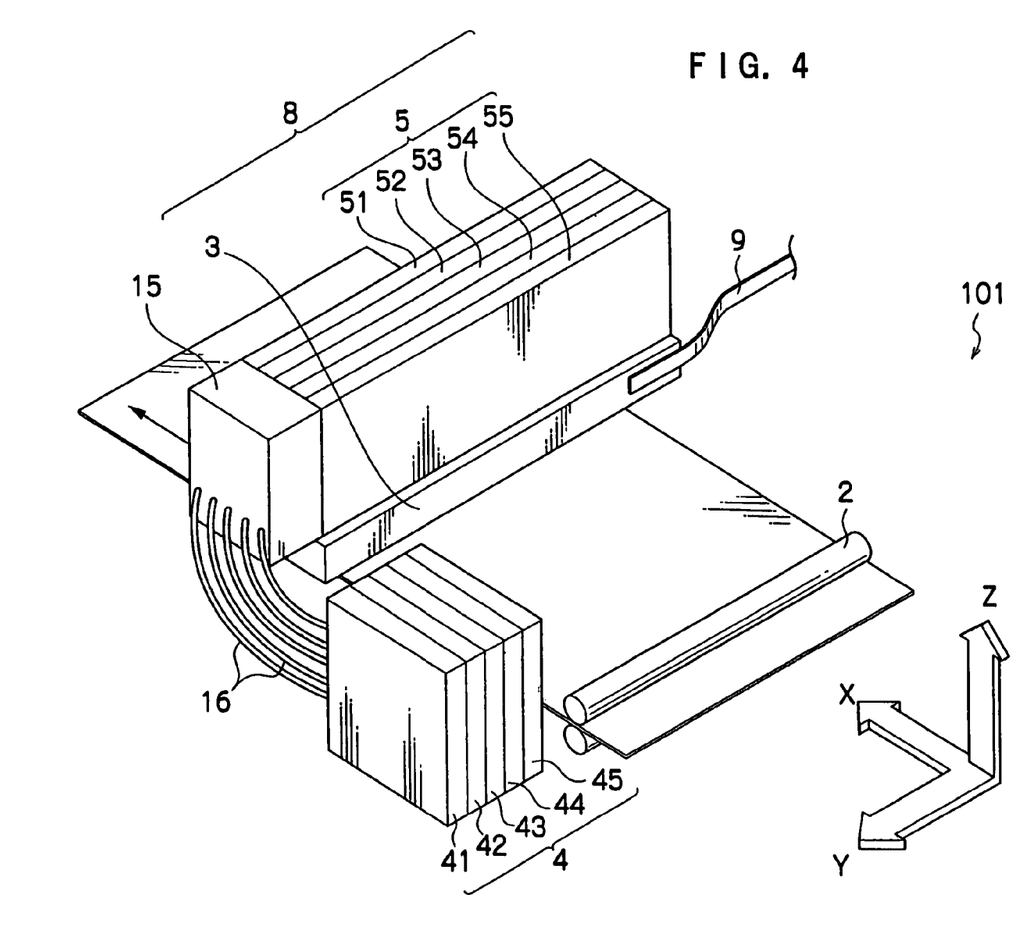
FIG. 4 is a perspective view showing the basic configuration of the inside of the inkjet recording apparatus of FIG. 3.
Figure 5A:
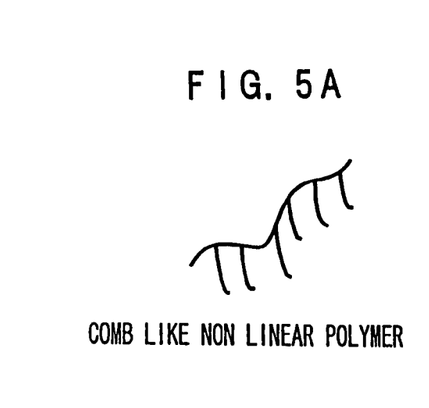
FIGS. 5A to 5F are schematic diagrams showing examples of the shapes of non-linear polymers.
Figure 5B:
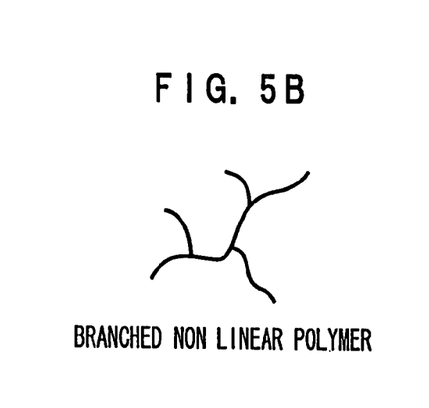
Figure 5C:
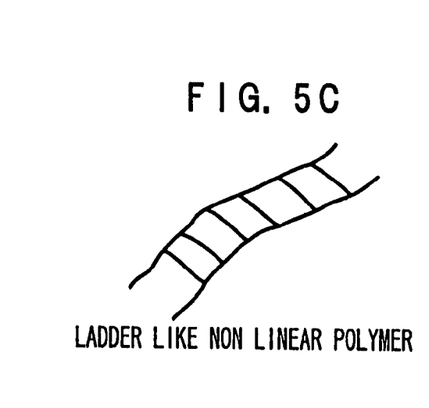
Figure 5D:
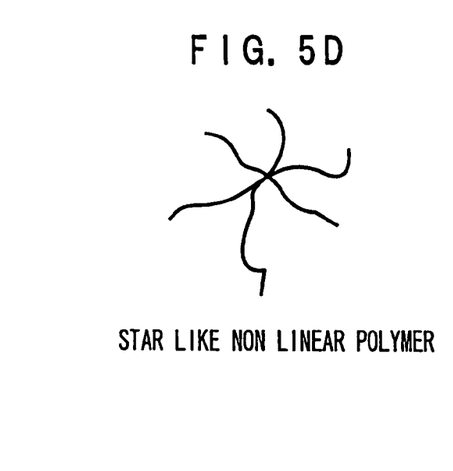
Figure 5E:
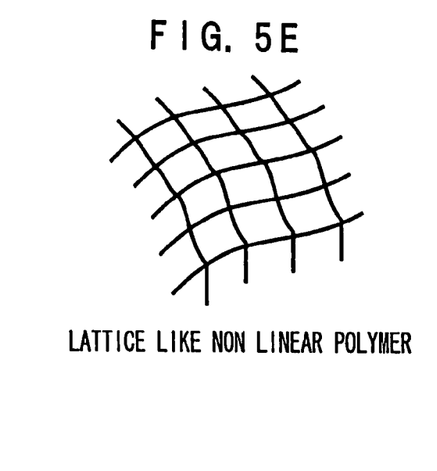
Figure 5F:
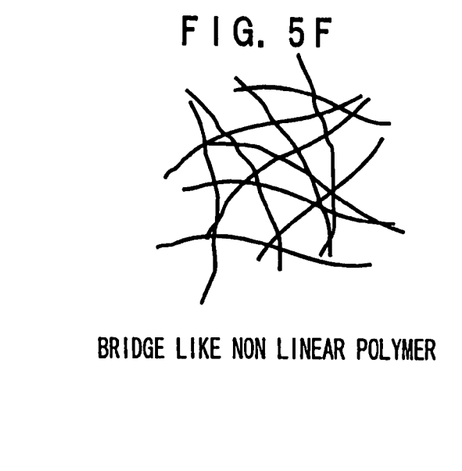

FIG. 3 is a perspective view showing the structure of an appearance according to another preferred embodiment of the inkjet recording apparatus according to the invention. FIG. 4 is a perspective view showing the basic structure of the interior of the inkjet recording apparatus (which will be hereinafter referred to as an image forming apparatus) in FIG. 3. The image forming apparatus 101 according to the embodiment has such a structure as to be operated to form an image based on the inkjet recording method according to the invention.

The image forming apparatus 101 shown in FIGS. 3 and 4 includes a recording head 3 having a width which is equal to or greater than the width of a recording medium 1, does not include a carriage mechanism, and is constituted by a paper feeding mechanism (which is a feeding roller 2 in the embodiment, but may be a paper feeding mechanism of a belt type, for example) in a sub-scanning direction (the transporting direction of the recording medium 1: the direction of an arrow X).

Sub-ink tanks 51 to 55 are arranged sequentially in the sub-scanning direction (the transporting direction of the recording medium 1: the direction of the arrow X) in the recording head 3 and similarly arranges a nozzle group for ejecting each color (including a processing liquid) in the sub-scanning direction, which is not shown. Since other structures are the same as those of the image forming apparatus 100 shown in FIGS. 1 and 2, description will be omitted.

In the drawing, the recording head 3 is not movable and, accordingly, the head 3 is always connected to a supplying device 15. However, the head 3 may be connected to the supplying device 15 when the ink is supplied to the recording head 3.

The image forming apparatus 101 shown in FIGS. 3 and 4 collectively carries out printing in the transverse direction (main scanning direction) of the recording medium 1 by means of the recording head 3. Therefore, the structure of the apparatus can be more simplified and a printing speed is more increased than a type having a carriage mechanism.

EXAMPLE

More specific description will be given to the invention by way of examples. Each of the examples does not restrict the invention.

[Ink Producing Method]

In the examples and the comparative examples, the inks are produced as follows. An appropriate amount of a colorant solution, a water-soluble organic solvent, a surfactant, ion exchange water, or the like so as to have each predetermined composition are mixed and the liquid mixture is agitated. The resultant liquid is allowed to pass through a 5 μm filter, a desired ink is obtained. The molecular structure of the nonlinear polymer is analyzed and identified, using an NMR, in which the liquid is purified through a column chromatography to obtain samples to be analyzed.

[Ink A]
(Bk Ink)
Cabojet-300 (produced by Cabot Corp.) (self dispersing pigment/carboxylic acid group): 4% by mass
Branched non-linear polymer sodium salt: 1.5% by mass

[It is produced by adding a polycarbodiimide based cross linking agent to the branched non-linear polymer: styrene/divinyl benzene/methacrylic acid=1/3/6 (mass ratio). The weight average molecular weight 6,500, Tg 55° C., the ratio of the molecular weight of the principal chain with respect to the total weight average molecular weight: 60% by mass, the cross linking agent ratio: 12% by mass, the partial structures of (branched, cross linking, mesh) are included in the molecule]
Diethylene glycol: 10% by mass
Glycerin: 5% by mass
2-pyrrolidone: 5% by mass
Acetylene glycol ethylene oxide adduct: 0.5% by mass
Ion exchange water: remainder The liquid has a pH value of 8.5, a volume average particle size of 93 nm, number of coarse particles having sizes of 5 μm or more per 1 μL of the ink of 33, surface tension of 31 mN/m, and viscosity of 3.3 mPa·s.

(Ink B)
(Cyan Ink)
C. I. Pigment Blue 15:3 (self dispersing pigment/sulfonic acid group): 3% by mass
Branched non-linear polymer lithium salt: 1.2% by mass

[Branched non liner polymer: polyester polymer (terephthalic acid/1,3-butane diol/trimeritic acid=2/3/1 (mass ratio) are polymerized: weight average molecular weight 9,500, Tg 60° C., the ratio of the molecular weight of the principal chain with respect to the total weight average molecular weight: 55% by mass, the partial structures of (branched) are included in the molecule]
Diethylene glycol: 15% by mass
Triethylene glycol monobutyl ether: 5% by mass
Acetylene glycol ethylene oxide adduct: 0.9% by mass
Ion exchange water: remainder The liquid has a pH value of 9.0, a volume average particle size of 101 nm, number of coarse particles having sizes of 5 μm or more per 1 μL of the ink of 28, surface tension of 31 mN/m, and viscosity of 3.3 mPa·s.

(Ink C)
(Magenta Ink)
C. I. Pigment Red 122 (self dispersing pigment/sulfonic acid group): 4% by mass
Ladder like non-linear polymer sodium salt: 1.0% by mass

[Ladder like non-linear polymer produced by polymerizing N, N'-methylene bisacrylic amide with acrylic amide by the mass ratio of (acrylic amide=N, N'-methylene bisacrylic amide=10:1): weight average molecular weight 8,000, Tg 65° C., the ratio of the molecular weight of the principal chain with respect to the total weight average molecular weight: 35% by mass, the partial structures of (branched, cross linking, mesh) are included in the molecule]
Diethylene glycol: 10% by mass
Diethylene glycol monobutyl ether: 5% by mass
Glycerin: 5% by mass
Acetylene glycol ethylene oxide adduct: 1.2% by mass
Ion exchange water: remainder The liquid has a pH value of 9.0, a volume average particle size of 96 nm, number of coarse particle having sizes of 5 μm or more per 1 μL of the ink of 29, surface tension of 30 mN/m, and viscosity of 3.2 mPa·s.

(Ink D)
(Yellow ink)
C. I. Pigment Yellow 74 (self dispersing pigment/sulfonic acid group): 4% by mass
Branched non-linear polymer sodium salt: 1.2% by mass

[It is produced by adding a polycarbodiimide based cross linking agent to the branched non-linear polymer: styrene/divinyl benzene/methacrylic acid=1/3/6 (mass ratio). The weight average molecular weight 6,500, Tg 55° C., the ratio of the molecular weight of the principal chain with respect to the total weight average molecular weight: 65% by mass, the cross linking agent ratio: 10% by mass, the partial structures of (branched, cross linking, mesh) are included in the molecule]
Diethylene glycol: 15% by mass
N-methyl-2-pyrrolidone: 5% by mass
Acetylene glycol ethylene oxide adduct: 1% by mass
Ion exchange water: remainder The liquid has a pH of 9.0, volume average particle size of 91 nm, number of coarse particles having sizes of 5 μm or more per 1 μL of the ink of 33, surface tension of 30 mN/m, and viscosity of 3.2 mPa·s.

[Ink E]
(Bk Ink)
Cabojet-300 (produced by Cabot Corp.) (self dispersing pigment/carboxylic acid group): 4% by mass
Branched non-linear polymer sodium salt: 0.8% by mass

[Branched non liner polymer: polyester polymer (terephthalic acid/1,3-butane diol/trimeritic acid=2/3/1 (mass ratio) are polymerized: weight average molecular weight 9,500, Tg 60° C., the ratio of the molecular weight of the principal chain with respect to the total weight average molecular weight: 55% by mass, the partial structures of (branched) are included in the molecule]
Diethylene glycol: 10% by mass
Glycerin: 5% by mass
2-pyrrolidone: 5% by mass
Acetylene glycol ethylene oxide adduct: 0.2% by mass
Ion exchange water: remainder The liquid has a pH value of 7.9, a volume average particle size of 111 nm, number of coarse particles having sizes of 5 μm or more per 1 μL of the ink of 23, surface tension of 31 mN/m, and viscosity of 3.2 mPa·s.

[Ink F]
(Bk ink)
Cabojet-300 (produced by Cabot Corp.) (self dispersing pigment/carboxylic acid group): 4% by mass
Styrene-sodium methacrylate copolymer: 1.5% by mass
Diethylene glycol: 10% by mass
Glycerin: 5% by mass
2-pyrrolidone: 5% by mass
Acetylene glycol ethylene oxide adduct: 0.2% by mass
Ion exchange water: remainder The liquid has a pH value of 7.9, volume average particle size of 99 nm, number of coarse particles having sizes of 5 μm or more per 1 μL of the ink of 30, surface tension of 31 mN/m, and viscosity of 3.1 mPa·s.

[Ink G]
(Bk Ink)
Cabojet-300 (produced by Cabot Corp.) (self dispersing pigment/carboxylic acid group): 4% by mass
Styrene-sodium acrylate copolymer: 2.5% by mass
Diethylene glycol: 10% by mass
Glycerin: 5% by mass
2-pyrrolidone: 5% by mass
Acetylene glycol ethylene oxide adduct: 0.2% by mass
Branched non-linear polymer (It is produced by adding a polycarbodiimide based cross linking agent to the branched non-linear polymer: styrene/divinyl benzene/methacrylic acid =1/3/6 (mass ratio). The weight average molecular weight 6,500, Tg 55° C., the ratio of the molecular weight of the principal chain with respect to the total weight average molecular weight: 60% by mass, the cross linking agent ratio: 7% by mass, the partial structures of (branched, cross linking, mesh) are included in the molecule): 1.0% by mass
Ion exchange water: remainder
The liquid has a pH value of 7.9, volume average particle size of 99 nm, number of coarse particles having sizes of 5 μm or more per 1 μL of the ink of 27, surface tension of 31 mN/m, and viscosity of 3.4 mPa·s.

[Ink H]
(Bk Ink)
Cabojet-300 (produced by Cabot Corp.) (self dispersing pigment/carboxylic acid group): 4% by mass
Polyvinyl pyrrolidone: 2.5% by mass
Diethylene glycol: 10% by mass
Glycerin: 5% by mass
2-pyrrolidone: 5% by mass
Acetylene glycol ethylene oxide adduct: 0.2% by mass
Ion exchange water: remainder
The liquid has a pH value of 8.2, volume average particle size of 99 nm, number of coarse particles having sizes of 5 μm or more per 1 μL of the ink of 56, surface tension of 31 mN/m, and viscosity of 3.5 mPa·s.

(Processing Liquid I)
Pyrrolidone carboxylic acid: 8% by mass
Sodium hydroxide: 3% by mass
Diethylene glycol: 20% by mass
Acetylene glycol ethylene oxide adduct: 1% by mass
Ion exchange water: remainder
The liquid has a pH value of 3.9, surface tension of 30 mN/m, and viscosity of 3.1 mPa·s.

(Processing Liquid J)

Branched non liner polymer: 0.3% by mass
(It is produced by adding a polycarbodiimide based cross linking agent to the branched non-linear polymer: styrene/divinyl benzene/methacrylic acid=1/3/6 (mass ratio). The weight average molecular weight 6,500, Tg 55° C., the ratio of the molecular weight of the principal chain with respect to the total weight average molecular weight: 60% by mass, the cross linking agent ratio: 5% by mass, the partial structures of (branched, cross linking, mesh) are included in the molecule]
Succinic acid: 7% by mass
Sodium hydroxide: 3% by mass
Diethylene glycol: 20% by mass
Acetylene glycol ethylene oxide adduct: 1% by mass
Ion exchange water: remainder
The liquid has a pH value of 6.7, surface tension of 31 mN/m, and viscosity of 2.9 mPa·s.

(Processing Liquid K)
Polyvinyl pyrrolidone (weight average molecular weight 17,000): 0.3% by mass
Citric acid: 6% by weight
Sodium hydroxide: 2.8% by mass
Diethylene glycol: 20% by mass
Acetylene glycol ethylene oxide adduct: 1% by mass
Ion exchange water: remainder
The liquid has a pH value of 4.0, surface tension of 30 mN/m, and viscosity of 2.8 mPa·s.

[Evaluation]

The printing evaluation is carried out using the combinations of the inks/processing liquids as shown in Table 1 using a prototype printer having a maintenance unit for storing a plurality of prototype printing heads of the 800 dpi, 256 nozzles and a plurality of inks accommodated therein. The inks and the processing liquids are used for printing on a FX-P paper (produced by Fuji Xerox Corp.) according to the combinations of the liquids of the examples and the comparative examples in this order. The of the ink ejection is 8 pl and the amount of the processing liquid ejection is 4 pl. Moreover, unless otherwise specified, the printing operation is carried out under an ordinary environment (temperature 23±0.5° C., humidity 55±5% R.H), and the evaluation is performed for the samples after the prints are allowed to stand under the ordinary environment for 24 hours after the printing operation.

(Optical Density)
The optical density of the printed portions is measured using the EXLITE 404 (produced by EXLITE Corp.).

Evaluation Criteria (Black Ink)
a: 1.4 or more optical density
b: 1.3 or more and less than 1.4 optical density
c: less than 1.3 optical density Evaluation Criteria (Color Ink)
a: 1.2 or more optical density
b: 1.1 or more and less than 1.2 optical density
c: less than 1.1 optical density (Rub Resistance)
After 30 minutes of the printing operation, a coating paper for inkjet, a high grade paper, C2 plain paper (produced by Fuji Xerox Co. Ltd.) is rubbed from the solid printed areas to the non-printed areas for visually observing the degree of cleanliness due to transfer of ink to the white areas.

Evaluation Criteria
a: substantially no dirt in the white areas
b: slight dirt in the white areas
c: considerable dirt in the white areas (Jetting Stability)

Evaluation Criteria
a: no occurrence of nozzle clogging
c: occurrence of nozzle clogging
The obtained results are shown in Table 1.

TABLE 1

| | Ink | Processing liquid | Rub resistance | Optical density | Jetting stability (nozzle clogging) |
| --- | --- | --- | --- | --- | --- |
| Example 1 | A | I | a | a | a |
| Example 2 | B | I | a | a | a |

TABLE 1-continued

|  | Ink | Processing liquid | Rub resistance | Optical density | Jetting stability (nozzle clogging) |
|---|---|---|---|---|---|
| Example 3 | C | I | a | a | a |
| Example 4 | D | I | a | a | a |
| Example 5 | E | J | a | a | a |
| Comparative example 1 | F | I | b to c | a | a |
| Example 6 | G | I | a | a | c |
| Comparative example 1 | H | K | b to c | a | a |

From the results of Table, it is understood that the examples in which the non-linear polymers are used have the excellent rub resistance and a high optical density so that a high quality image can be obtained compared with the comparative examples in which the linear polymers are used. Moreover, it is also understood that the examples 1 to 5 have the excellent jetting characteristics (jetting stability) as well.

What is claimed is:

1. A processing liquid for inkjet containing a water-soluble organic solvent and water, a component having the function of aggregating or insolubilizing a component in a recording liquid when the processing liquid comes into contact with the recording liquid containing at least a colorant and water, wherein the processing liquid contains a non-linear polymer, wherein the ratio of the weight average molecular weight of the principal chain of the non-linear polymer with respect to the total weight average molecular weight of the non-linear polymer is 30 to 95%, the non-linear polymer has an acidic value of 80-250 mgKOH/g and the principal chain of the non-linear polymer is hydrophilic.

2. The processing liquid for inkjet according to claim 1, wherein the non-linear polymer has at least one selected from the group consisting of a branched structure, a cross-linking structure and a mesh structure in a molecule.

3. The processing liquid for inkjet according to claim 1, wherein the non-linear polymer has a branched shape or ladder like shape.

4. The processing liquid for inkjet according to claim 1, wherein the non-linear polymer is water-soluble.

5. The processing liquid for inkjet according to claim 1, wherein the weight average molecular weight of the non-linear polymer is about 1,000 to about 100,000.

6. The processing liquid for inkjet according to claim 1, wherein the viscosity of the processing liquid is 1.2 to 30.0 mPa·s.

7. An ink set for an inkjet comprising an ink for an inkjet containing at least a colorant, a water-soluble organic solvent and water, and the processing liquid for inkjet according to claim 1.

8. The processing liquid for inkjet according to claim 1, wherein the ratio of the weight average molecular weight of the principal chain of the non-linear polymer with respect to the total weight average molecular weight of the non-linear polymer is 40 to 90%.

9. The processing liquid for inkjet according to claim 1, wherein the ratio of the weight average molecular weight of the principal chain of the non-linear polymer with respect to the total weight average molecular weight of the non-linear polymer is 50 to 80%.

10. The processing liquid for inkjet according to claim 1, wherein the non-linear polymer has a cross-linking structure synthesized by using a cross linking agent and the ratio of the cross linking agent with respect to a main component of the cross-linked non-linear polymer is 0.01 to 30% by mass, wherein the main component of the cross-linked non-linear polymer is the non-linear polymer excluding the cross linking agent.

* * * * *